(12) United States Patent
Woronowicz (10) Patent No.: US 9,331,527 B2
(45) Date of Patent: May 3, 2016

(54) SYSTEM AND METHOD FOR TRANSFERRING ELECTRIC ENERGY TO A VEHICLE USING SEGMENTS OF A CONDUCTOR ARRANGEMENT WHICH CAN BE OPERATED INDEPENDENTLY

(75) Inventor: Konrad Woronowicz, Kingston (CA)

(73) Assignee: Bombardier Transportation GmbH, Berlin (DE)

( * ) Notice: Subject to any disclaimer, the term of this patent is extended or adjusted under 35 U.S.C. 154(b) by 61 days.

(21) Appl. No.: 14/124,301

(22) PCT Filed: Jun. 11, 2012

(86) PCT No.: PCT/EP2012/061028
§ 371 (c)(1),
(2), (4) Date: Dec. 6, 2013

(87) PCT Pub. No.: WO2012/168478
PCT Pub. Date: Dec. 13, 2012

(65) Prior Publication Data
US 2014/0116831 A1 May 1, 2014

(30) Foreign Application Priority Data

Jun. 10, 2011 (GB) .................................. 1109825.8

(51) Int. Cl.
*B60L 9/00* (2006.01)
*H02J 17/00* (2006.01)
(Continued)

(52) U.S. Cl.
CPC .................. *H02J 17/00* (2013.01); *B60L 5/005* (2013.01); *B60L 9/00* (2013.01); *B60M 3/04* (2013.01); *B60L 2200/18* (2013.01); *B60L 2200/26* (2013.01); *Y10T 29/49117* (2015.01)

(58) Field of Classification Search
CPC .............. B60L 5/00; B60L 5/005; B60L 5/34; B60L 5/36; B60L 5/42; B60L 9/00; B60L 9/02; B60L 9/04; B60L 9/08
USPC .............. 191/2–6, 22 R, 23 R, 22 C, 45 R, 46
See application file for complete search history.

(56) References Cited

U.S. PATENT DOCUMENTS

| 6,005,304 | A | 12/1999 | Seelig |
| 6,879,889 | B2* | 4/2005 | Ross ....................... B60L 5/005 |
| | | | 180/167 |
| 2003/0200025 | A1 | 10/2003 | Ross |

FOREIGN PATENT DOCUMENTS

| CA | 2403762 A1 | 9/2002 |
| DE | 19856937 A1 | 6/2000 |

(Continued)

OTHER PUBLICATIONS

Covic et al., A Three-Phase Inductive Power Transfer System for Roadway-Powered Vehicles, IEEE Transactions on Industrial Electronics, Dec. 2007, pp. 3370-3378, 54, 6.

*Primary Examiner* — R. J. McCarry, Jr.
(74) *Attorney, Agent, or Firm* — The Webb Law Firm (57) ABSTRACT

A system and method for transferring electric energy to a vehicle includes at least one electric conductor arrangement for producing an alternating electromagnetic field and for transferring electromagnetic energy to the vehicle. The conductor arrangement includes a plurality of segments, each extending along a section of the path of travel of the vehicle and including one line for each phase of alternating current carried by the segment to produce the electromagnetic field. A plurality of source units connected in parallel provide the alternating current to the segment and a current supply conducts electrical energy to the plurality of source units. At least a first source unit is connectable to each segment of a first set of at least two segments of the at least one conductor arrangement. Each neighboring segment of the first set of segments is exclusively connectable to another source unit.

17 Claims, 5 Drawing Sheets

(51) Int. Cl.
*B60L 5/00* (2006.01)
*B60M 3/04* (2006.01)

(56) References Cited

FOREIGN PATENT DOCUMENTS

| EP | 0289868 | A2 | 11/1988 |
| EP | 2156979 | A1 | 2/2010 |
| GB | 2461578 | A | 1/2010 |
| GB | 2463692 | A | 3/2010 |
| WO | 9323908 | A1 | 11/1993 |
| WO | 9323909 | A1 | 11/1993 |
| WO | 9908359 | A1 | 2/1999 |
| WO | 9930402 | A1 | 6/1999 |
| WO | 2010000495 | A1 | 1/2010 |
| WO | 2010031593 | A2 | 3/2010 |
| WO | 2011145953 | A1 | 11/2011 |

\* cited by examiner

SYSTEM AND METHOD FOR TRANSFERRING ELECTRIC ENERGY TO A VEHICLE USING SEGMENTS OF A CONDUCTOR ARRANGEMENT WHICH CAN BE OPERATED INDEPENDENTLY

CROSS-REFERENCE TO RELATED APPLICATIONS

This application is the U.S. national phase of International Application No. PCT/EP2012/061028 filed Jun. 11, 2012, and claims priority to United Kingdom Patent Application No. 1109825.8 filed Jun. 10, 2011, the disclosures of which are hereby incorporated in their entirety by reference.

BACKGROUND OF THE INVENTION

1. Field of the Invention

The invention relates to the transfer of electric energy to a vehicle, in particular to a track bound vehicle such as a light rail vehicle (e.g. a tram) or to a road automobile such as a bus or a private automobile. A corresponding system comprises an electric conductor arrangement for producing an alternating electromagnetic field and for thereby transferring electromagnetic energy to the vehicle. The conductor arrangement comprises a plurality of segments, wherein each segment extends along a different section of the path of travel (track) of the vehicle. The invention also relates to a corresponding method of manufacturing the system and to a corresponding method of operating the system.

2. Description of Related Art

Track bound vehicles, such as conventional rail vehicles, mono-rail vehicles, trolley busses and vehicles which are guided on a track by other means, such as other mechanical means, magnetic means, electronic means and/or optical means, require electric energy for propulsion on the track and for operating auxiliary systems, which do not produce traction of the vehicle. Such auxiliary systems are, for example, lighting systems, heating and/or air condition system, the air ventilation and passenger information systems. However, more particularly speaking, the present invention is related to a system for transferring electric energy to a vehicle which is not necessarily (but preferably) a track bound vehicle. A vehicle other than a track bound vehicle is a bus, for example. An application area of the invention is the transfer of energy to vehicles for public transport. Generally speaking, the vehicle may be, for example, a vehicle having an electrically operated propulsion motor. The vehicle may also be a vehicle having a hybrid propulsion system, e.g. a system which can be operated by electric energy or by other energy, such as electrochemically stored energy or fuel (e.g. natural gas, gasoline or petrol).

WO 2010/031593 A1 describes a system and a method for transferring electric energy to a vehicle, wherein the system comprises the features mentioned above. It is disclosed that the system comprises an electric conductor arrangement for producing an alternating electromagnetic field and for thereby transferring the energy to the vehicle. The electric conductor arrangement comprises at least two lines, wherein each line is adapted to carry a different one of phases of an alternating electric current. The conductor arrangement comprises a plurality of segments, wherein each segment extends along a different section of the path of travel of the vehicle. Each segment comprises sections of the at least two lines and each segment can be switched on and off separately of the other segments. Each one of successive segments of the conductor arrangement can be connected via a separate switch for switching on and off the element to a mainline.

WO 2010/000495 A1 describes the field of invention and possible embodiments of the conductor arrangement in more detail. In particular, the serpentine-like embodiment of the conductor arrangement can also be chosen for the present invention.

Each segment may be connected to a direct current supply via an inverter for converting the direct current to an alternating current for producing the electromagnetic field. Alternatively, the segments may be connected to an alternating current supply, for example via an AC/AC voltage converter. Combinations are possible, for example two segments may be connected to a direct current supply via a common inverter.

US 2003/0200025 A1 discloses a roadway-powered electric vehicle system comprising a network of roadways electrified with a multiplicity of roadway power transmitting modules embedded in the roadways at selected locations, each of said roadway power transmitting modules being connected to receive power from an electrical utility. The document also discloses that the roadway power transmitting modules can be grouped in clusters of five modules with each cluster being powered from the same power conditioner. The clusters are spaced along the length of the roadway with a non-electrified section of roadway separating the clustered sections. Therefore, neighboring modules of a cluster are powered from the same power conditioner. To provide a continuous power transfer to an electric vehicle, however, the power conditioner needs to power more than one module at a time or to switch between the respective modules of the cluster. Operating more than one module at a time disadvantageously can reduce the power transferred to the operated modules and/or can disadvantageously change desired parameters, e.g. a nominal value or rms-value of an operating alternating current, of the power supply. Switching between the modules can also disadvantageously alter the quality of power supply to an electric vehicle, e.g. in case multiple segments need to be powered to provide sufficient power to the vehicle. This is e.g. the case if a vehicle, e.g. a rail vehicles or a trolley bus, comprises more than one receiver and covers more than one segment such that power needs to be transmitted by closely spaced segments, e.g. neighboring segments.

In order to transfer sufficient power for providing vehicles (in particular trams or busses) for propulsion, currents of at least some tens of Amperes and voltages of at least some tens of Volts are required, i.e. the transferred power should be in the range of at least some kW. In case of a tram, for example, the voltage at the segment may be in the range of 500-1.000 V and the effective current through the segment may be in the range of 150-250 A.

Corresponding impedances, in particular inductances, require heavy components having corresponding large volumes. In addition, these components produce a significant part of the costs of manufacturing such a system.

SUMMARY OF THE INVENTION

The system of the present invention is designed in order to provide a system for transferring electromagnetic energy from a track to a vehicle or to a plurality of vehicles, e.g. a track bound vehicle such as a light rail vehicle (e.g. a tram) or to a road automobile such as a bus.

The system comprises at least one electric conductor arrangement for producing an alternating electromagnetic field and for thereby transferring electromagnetic energy to the vehicle.

The conductor arrangement comprises a plurality of segments, wherein each segment extends along a section of the path of travel of the vehicle, preferably along a different section of the path compared to all other segments of the conductor arrangement, so that the segments are consecutive segments along the path. The segments may be closely-spaced e.g. with a distance less a few meters between two neighboring segments.

Each segment comprises one line for each phase of an alternating current which is to be carried by the segment in order to produce the electromagnetic field.

Furthermore, the system comprises a plurality of source units for providing an alternating current to the segments and a current supply for conducting electric energy to the plurality of source units. The plurality of source units is connected in parallel to each other with respect to the current supply.

A first source unit of the plurality of source units is connectable to each segment of a first set of at least two segments (preferably at least two of the segments of the set being segments of the same track, i.e. the same path of travel of the vehicle) of the at least one conductor arrangement. In other words, the conductor arrangement comprises a first set of at least two segments, wherein each of the segments of the first set of segments is connectable to the first source unit. The segments of the first set of segments are assigned to the first source unit which means that the segments of the first set of segments can be operated by the first source unit.

In this context, "connectable" means that each line of a respective segment can electrically be coupled to a source unit. The term "coupled" includes a direct electric connection and alternatively includes inductive coupling, for example using a transformer. The connection of the first source unit can be switched on or off. If the connection is switched on, electric power can be conducted to the connected segment. If the connection is switched off, no electric power can be conducted to the connected segment.

The segments can be electrically arranged in parallel to each other with respect to the source unit, i.e. each of the segments which can be operated by the source unit can be operated using the alternating current.

Therefore, at least one source unit of the system is connected to a current supply on its input side and can be connected to a plurality of segments on its output side. This means that it is possible to connect two or more segments to the same source unit.

However, it is preferred that only one of the segments is provided with electric energy by the source unit at each point in time. The maximal number of segments which can be operated by a single source unit depends on the heat power dissipation (i.e. the heat which is produced during operation of the source unit must be transported away from the source unit) and/or vehicle separation (i.e. it should not happen that different vehicles on the track receive electromagnetic energy from segments, which are provided by the same source unit at the same time) and/or distances between the source units and the segments connectable to the respective source unit (i.e. none of the distances should be too long).

A common current supply for the plurality of source units does not exclude the existence of further source units which are connected to a separate, second current supply. Furthermore, not all segments which can be operated by a common source unit must be segments for providing vehicles on the same track with energy. Rather, a railway or a road may comprise, for example, two tracks extending in parallel to each other and each of the tracks may be provided with consecutive segments. At least some of the segments of different tracks may be operated by a common source unit.

According to one aspect of the invention, in particular in case of all segments of the track being consecutive segments, each neighboring segment of each segment of the first set of segments is exclusively connectable to another source unit. Generally speaking, "neighboring segment" denotes an adjacent or consecutive or succeeding segment with respect to a possible direction of travel of the vehicle along the segments. "Exclusively" denotes that the neighboring segment is not connectable to the first source unit, at least during a predefined mode of operation. This means that the system is designed such that none segment of the first set of segments has a neighboring segment that is connectable to the first voltage converter.

As described below, a source unit can, in particular, comprise or consist of a voltage converter (such as an AC/AC converter or an inverter) and/or a constant current source. The constant current source can form a passive network which keeps the alternating current through the segment constant while the load or coupling to the secondary side (the side of the vehicle's receiver) varies. The constant current source can provide an alternating current with a constant effective value or RMS (root mean square)-value.

The proposed invention advantageously allows transferring power to an electric vehicle using more than one segment of a set of multiple closely-spaced segments simultaneously while desired characteristics of the power are provided, e.g. a desired power level.

As the proposed invention also allows using a single source unit to operate or power a set of segments, the number of wayside source units can be reduced. E.g. if each source unit is adapted to power two segments, the number of wayside source units is reduced by the factor 2. The duty cycle of each source unit, however, increases by the factor 2, and therefore the heat power dissipation increases.

In another embodiment, a source unit is connectable to a segment by a switching unit. For example, each of the segments of the first set of segments may be coupled to the source unit via an associated switching unit adapted to switch on and off the segment by connecting or disconnecting the segment to/from the source unit. However, in particular in the case of two segments per set of segments only, a single switching unit may have two switching states. In the first switching state, the source unit is connected to the first segment and in the second switching state, the source unit is connected to the second segment. Each switching unit may comprise a number of switches which corresponds to the number of lines of the associated segment(s), wherein the lines are adapted to carry a different phase of an alternating current. Preferably, the switches of the switching unit are synchronously switched on and off, for example by using a common control device for controlling the operation of the switches. The switching device can for example comprise one or more semiconductor switches, e.g. one in each phase line. The switching device therefore allows coupling the plurality of segments to the current supply via the source unit.

This advantageously allows a simple implementation of an electric connection which may be switched on or off.

In another embodiment, a source unit comprises a voltage converter. The voltage converter can change (convert) a given input voltage, e.g. the input voltage provided by the current supply, to a desired output voltage.

The voltage converter can be a transformer. In this case, the current supply can be an alternating current supply and the voltage converter transforms a given alternating input voltage to a desired alternating output voltage.

Alternatively, the voltage converter can be an inverter. In this case, the current supply can be a direct current supply and the voltage converter transforms a given direct current input voltage to a desired alternating current output voltage.

For example, the voltage converter can comprise to converting units, e.g. two inverting units, wherein the two converting units have a common output. Thus, the maximum electric power is increased.

Therefore, a segment can be connected to the current supply via the voltage converter, e.g. a transformer or an inverter.

The switching unit can be arranged such that the voltage converter is connected to the current supply on the input side and to the switching unit on the output side. As an option, the switching unit can be operated such that the source unit is connected to one or more segments which are connectable to the switching unit or such that none of the segments which are connectable to the switching unit is connected to the source unit.

This advantageously allows providing an alternating voltage with desired characteristics to the segments.

In a preferred embodiment, a source unit comprises a constant current source. The constant current source is adapted to keep an effective value or a RMS-value of an electric current through the segment constant—while the segment is switched on or connected to the source unit—independently of the electric power which is transferred to one or more vehicles travelling along the segment.

In this case, the segments which are connectable to a source unit can be coupled to the current supply via a constant current source.

Each constant current source can comprise a first inductance, and optionally more than one inductance, and can comprise a first capacitance, and optionally more than one capacitance. The inductance(s) and the capacitance(s) are adapted to each other, to the inductance of the segment(s) and to the voltage at the input side of the constant current source so that a desired constant current is output to the output side, i.e. the side of the segment. Therefore, the input side of the constant current source is the side of the current supply or the output side of a voltage converter. In the latter case, a segment can be coupled to the current supply via a series connection of a voltage converter and a constant current source.

The first inductance may be arranged in a line of the constant current source which connects the input side with the output side and at least one junction of the line may be connected with the first capacitance.

In other words, at least the first inductance and the first capacitance, and optionally further impedances of the constant current source and possibly further components of the constant current source (e.g. at least one resistor), form a passive network which keeps the alternating current through the segment constant.

Preferably, the inductance(s) and the capacitance(s) are adapted to the frequency of the alternating current on the input side of the constant current source so that the alternating current through the segment oscillates at a resonance frequency, which is the resonance frequency of the combination of the segment with the constant current source.

In case that the segment comprises a plurality of lines, wherein each line is adapted and connected to carry a different phase of the alternating current, the constant current source comprises a corresponding number of lines which are connected, in each case, to the corresponding line of the segment, so that a series connection of the line of the constant current source and the corresponding line of the segment is performed. In case of a plurality of lines, each line of the constant current source comprises a first inductance and a first impedance (in particular a capacitance) is connected to the line via a junction. In particular, the junctions of different lines of the constant current source may be connected to a common star point via the corresponding first capacitance. In any case, there may be two junctions per line, a first capacitance may be connected to a first junction of the line and a second capacitance may be connected to a second junction of the line. If the first inductance is arranged between the first and second junction, the network can be called a Π-network. If there is just one junction per line and if there is at least one inductance within the line at both sides of the junction (the second inductance may be the inherent inductance of the segment), the network can be called a T-network. In the preferred embodiment, a T-network is used as a constant current source.

Any segment which is adapted to produce an electromagnetic field in order to transfer energy to a vehicle comprises an inherent inductance. The inherent inductance can be used to keep the reactive power small. Therefore, it is proposed that the first inductance and the first capacitance as well as a second inductance, which is formed at least partly (preferably completely) by the inherent inductance of the segment (including the inductance of the electric connection of the constant current source to the segment), are adapted to each other and to any additional capacitance in the segment so that the segment can be operated at a corresponding resonance frequency and the reactive power produced by the segment is essentially zero. Preferably, the second inductance is completely formed by the inherent inductance of the segment or of the line of the segment. Furthermore, it is preferred that the segment does not comprise an additional capacitance which compensates the inherent inductance(s) of the segment in order avoid a production of reactive power by the segment. In other words, the real power, sometimes called "active power", is as high as possible.

Since the inherent inductance of the segment is used to optimize the efficiency of energy transfer, the number of discrete components can be reduced: First, compared to a T-network having inductances of the same size at both sides of the junction, the inductance at the output side of the constant current source can be reduced or omitted. Second, additional capacitances for compensating the inherent inductance of the segment in order to reduce or eliminate the reactive power can be omitted or can be reduced to a smaller size. As a result, installation effort and costs are reduced. Furthermore, the effort for cooling the inductance at the output side of the constant current source is reduced, since there is only a small discrete component (for example a small inductor) or there is no discrete component at the output side of the constant current source, and the inductance of the segment is an inherent property and is therefore distributed over the whole segment.

A switching unit can be arranged such that the constant current source is connected to the current supply on the input side and to the switching unit on the output side.

If the source unit comprises a voltage converter, the switching unit can be arranged such that the voltage converter is connected to the current supply on the input side and to the constant current source on the output side, wherein the constant current source is connected to the switching unit on the output side. Alternatively, the switching unit can be arranged such that the voltage converter is connected to the current supply on the input side and to the switching unit at the output side. In this case, the source unit can comprise a plurality of constant current sources, preferably one constant current source for each segment which is connectable to the voltage converter. In this case, the switching unit is connected to the output of the voltage converter on the input side and connectable to the inputs of the constant current sources on the output side. Alternatively, the switching unit or elements of the switching unit, e.g. switches of the switching unit, can be arranged between the first inductance and the first capacitance of a constant current source, e.g. on an output side of the first inductance of the constant current source.

Producing a constant alternating current (i.e. an alternating current with a constant RMS-value) in the line or lines of the segments has several advantages compared to the operation of the segment at constant (RMS) voltage. One advantage is that the constant current may be a sinus function of time. This means that only a single frequency of electromagnetic waves is produced. Operating the segment at constant voltage in contrast produces non-sinusoidal functions, which means that harmonics at different frequencies are produced. Furthermore a constant current on the primary side (the side of the conductor arrangement along the track) enables to reduce the size of the receiver for receiving the electromagnetic field on the secondary side (the side of the vehicle).

The constant current source can be realized as a passive network of impedances, which means that none of the components of the constant current source is actively controlled as it would be in the case of a transistor in the line which is used for current limitation.

The constant current source can e.g. be located on the input side of an alternating current supply, i.e. a constant alternating current is fed to the segments via the current supply. However, this does not allow for individual operation of the segments, if the segments are connected in parallel to each other with the current supply. Individual operation of the segments would result in currents through the segments of the varying size.

Therefore, it is preferred for segments, which are connected in parallel to each other with respect to a current supply, to provide a constant current source for each segment which is to be operated individually. Such an individual operation has the advantage that the segment can be switched on while a vehicle is traveling along the segment and can be switched off otherwise.

In a preferred embodiment, only one segment of the first set of segments is operated at a time. This means that only one segment of the first set of segment is connected to the first source unit. The proposed system, i.e. the source unit, the segments and the corresponding connections, can be arranged and/or designed such that only one segment of the first set of segments is operable at a time.

In cases where two or more segments which are connectable to a single source unit are triggered to provide power to a vehicle or more than one vehicle, e.g. if two trains are bunched on behind another, the source unit can exclusively be connected to the segment which is the foremost with respect to the direction of travel of the vehicle or the vehicles. This allows multi-vehicle operation.

This embodiment is in particular of advantage if the source unit comprises a constant current source which is adapted to the inherent inductance provided by each segment, including its connection to the constant current source of a set of segments connectable to the source unit. As previously described, any segment and its connection to the source unit comprises an inherent inductance. It is desirable to adapt the first inductance and the first capacitance as well as a second inductance, which is formed at least partly (preferably completely) by the inherent inductance of the segment, to each other and to any additional capacitance in the segment so that the segment can be operated at a corresponding resonance frequency and the reactive power produced by the segment is essentially zero.

If a source unit comprises a constant current source which is adapted to the inherent impedances of the connectable segments, operating more than one segment at a time, i.e. connecting more than one segment at a time to an output of the constant current source, will disadvantageously alter characteristics of an alternating current provided by the constant current source, e.g. the RMS-value of the alternating current will not be optimal and therefore the quality of the power transfer is reduced.

It is however possible that the proposed system comprises a plurality of constant current sources, e.g. one constant current source per segment. The source unit can comprise a voltage converter which is connectable to a series connection of one constant current source and a segment. In this case, each segment is assigned one constant current source of the plurality of constant current sources and a connection between the source unit, e.g. the voltage converter, and a segment is made via the assigned constant current source. In this case, the constant current source assigned to a segment can be adapted to the inherent impedance of the respective segment and its connection to the respective segment.

According to a further embodiment, the at least first set of segments (i.e. the first set of segments or a plurality of sets of segments) comprises (for each set) an even-numbered plurality of segments. It is, however, also possible that all segments of the conductor arrangement are grouped into sets of segments which are respectively connectable to a source unit. Preferably, these sets of segments comprise an even-numbered set of segments. In particular, the at least set of segments or each set of segments comprises two segments.

Assigning more than one segment to one source unit advantageously allows using a reduced number of source units while providing or transferring power from the track to the electric vehicle. This, in turn, saves costs and reduces a complexity of the system.

In another embodiment, at least one segment which is connectable to a second source is placed between two succeeding segments of the first set of segments. The at least one segment which is connectable to a second voltage converter can be one segment of a second set of at least two segments. Preferably, two segments are placed between two succeeding segments of the first set of segments, wherein one of the two segments is connectable to a second source unit and the other one of the two segments is connectable to a third source unit. The segment which is connectable to the second source unit can be a segment of a second set of at least two segments. Also, the segment which is connectable to the third source unit can be a segment of a third set of segments. In this case, a source unit operates every third segment. According to other variants, there may be more or less than two segments in between two succeeding segments of the first set of segments. However, preferably, all segments in between the two succeeding segments are connectable to different source units.

In another embodiment, the first source unit is designed and/or is arranged such that inherent impedances of the connections of the first source unit to the segments of the first set of segments are equal. In particular this means that the inductances of all connections to segments "seen" at the output of the first source unit are equal. This embodiment is preferably chosen if the source unit comprises a constant current source. As previously described, any segment including its connection to the source unit comprises an inherent inductance, wherein it is desirable to adapt a first inductance and a first capacitance of a constant current source as well as a second inductance, which is formed at least partly (preferably completely) by the inherent inductance of the segment, to each other and to any additional capacitance in the segment so that the segment can be operated at a corresponding resonance frequency and the reactive power produced by the segment is essentially zero. In this case, a single constant current source can advantageously be used to operate the segments connectable to the source unit as the single constant current source can be designed such that it is adapted to all segments.

Alternatively or in addition, the first source unit is arranged with respect to at least two segments of the first set of segments such that a distance between the first source unit and each of the at least two segments is equal. If the first set of segments comprises e.g. two segments, the first source unit can be arranged equidistant to both segments. Distance refers to a length of an electric connection or coupling of the first source unit and the segments. Preferably, the segments are designed in equal manner. In this case, the inherent impedances, in particular the inductances, of the segments including the respective electric connection to the source unit are equal.

In another embodiment, the first set of segments comprises a first plurality of segments of a first conductor arrangement and a second plurality of segments of a second conductor arrangement. The first conductor arrangement can e.g. be assigned to a first travel path and the second conductor arrangement can e.g. be assigned to a second travel path which is different from the first travel path. In this case, the at least first voltage converter can be connectable to a first set of segments of a first conductor arrangement and a plurality of segments, e.g. another set of segments, of a second conductor arrangement.

In another embodiment, the first conductor arrangement is assigned to a first track and the second conductor arrangement is assigned to a second track. A railway or a road may comprise, for example, two tracks extending e.g. in parallel to each other and each of the tracks may be provided with consecutive segments. At least some of the segments of different tracks may be operated by a common source unit.

Further proposed is a method of operating a system for transferring electric energy to a vehicle, in particular the system of one of the preceding claims. In a first step an alternating electromagnetic field is produced and thereby electromagnetic energy is transferred to the vehicle by using an electric conductor arrangement. Further, a plurality of segments is used as parts of the conductor arrangement, wherein each segment extends along a different section of the path of travel of the vehicle, wherein one line or a plurality of lines of each segment is/are used to carry a respective phase or respective phases of an alternating current which produces the electromagnetic field. Also, a plurality of source units is used to conduct electric energy to the plurality of segments, wherein at least a first source unit of the plurality of source unit s is connectable to a first set of at least two segments. Also, electric energy is conducted to the plurality of source units by using a current supply, wherein the source units are electrically connected in parallel to each other with respect to the current supply. Further, electric energy is conducted to at least one segment of the first set of segments by connecting the first source unit to the at least one segment.

According to the invention, electric energy is conducted to a neighboring segment of the at least one segment of the first set of segments by connecting the neighboring segment (in particular the neighboring segment in a sequence of consecutive segments) to another source unit. The electric energy can be conducted to the neighboring segment at the same time. Alternatively, the electric energy can be conducted to the neighboring segment subsequently or previously to the respective segment.

The connection of the other source unit to the neighboring segment can be conducted or executed such that a smooth transition of the magnetic field between the neighboring segments is provided, e.g. such that the magnetic field is a uniform and continuous wave during the transition.

The proposed method advantageously allows operating a system for transferring electric energy to a vehicle using more than one segment of a set of multiple closely-spaced segments with a reduced number of source units while still providing desired characteristics of the transferred power, e.g. a desired power level.

In another embodiment, during the conduction of electric energy, a source unit is connected exclusively to one segment of the set of segments which is connectable the source unit.

This means that only one segment of the set of segments is operated at a time by a source unit. During conduction of electric energy one segment of the first set of segments, the first source unit is connected exclusively to the one segment. The advantages of this exclusive power transfer have been described previously.

Further proposed is a method of manufacturing a system for transferring electric energy to a vehicle, in particular the system of one of the preceding claims, including the steps:

providing an electric conductor arrangement for producing an alternating electromagnetic field and for thereby transferring electromagnetic energy to the vehicle, providing a plurality of segments as part of the conductor arrangement, so that each segment extends along a section of the path of travel of the vehicle, wherein each segment comprises one line for each phase of an alternating current which is to be carried by the segment in order to produce the electromagnetic field, providing a plurality of source units, providing a current supply for conducting electric energy to the plurality of the source units, wherein the source units are electrically connected in parallel to each other with respect to the current supply, for each segment providing a switchable electric connection of the segment and a source unit such that for each segment of at least a first set of at least two segments an electrical connection between the segment and a first source unit is provided.

According to the invention, for each neighboring segment of each segment of the first set of segments an electrical connection between the neighboring segment and another source unit is provided. This means that the system is designed such that each neighboring segment of each segment of the first set of segments is, e.g. exclusively, connectable to another source unit.

This advantageously allows to provide a system which allows to transfer power to a electric vehicle using more than one segment of a set of multiple closely-spaced segments while desired characteristics of the power are provided, e.g. a desired power level.

In another embodiment, the electric connections between the first source unit and the segments of the first set of segments are provided such that the first source unit is connectable exclusively to one segment of the first set of segments. This means that the system is manufactured or designed such that only one segment per source unit can be operated at a time. The advantages of this exclusive power transfer have been described previously.

During operation, while a vehicle travels along a track comprising a sequence of consecutive segments, it is preferred that the neighboring segment in front of an active segment (i.e. a segment which transfers electromagnetic energy to the vehicle) is switched on (i.e. becomes active), before the active segment is switched off. In particular in this case, the operation of the two neighboring segments is preferably synchronized in such a manner that there is a continuous electromagnetic field at the interface between the two neighboring segments. In case the source units being voltage converters, the source units that provide the two neighboring segments with energy are correspondingly synchronized. Therefore, it is preferred for any embodiment of the present invention that the source units are controlled by a common control arrangement, which may comprise a central control for different source units and/or controls of different source units may be connected to each other.

BRIEF DESCRIPTION OF THE DRAWINGS

Embodiments and examples of the invention will be described with reference to the attached figures. The figures show.

In all figures, same reference signs denote elements and devices having the same or similar function.

Figure 1:
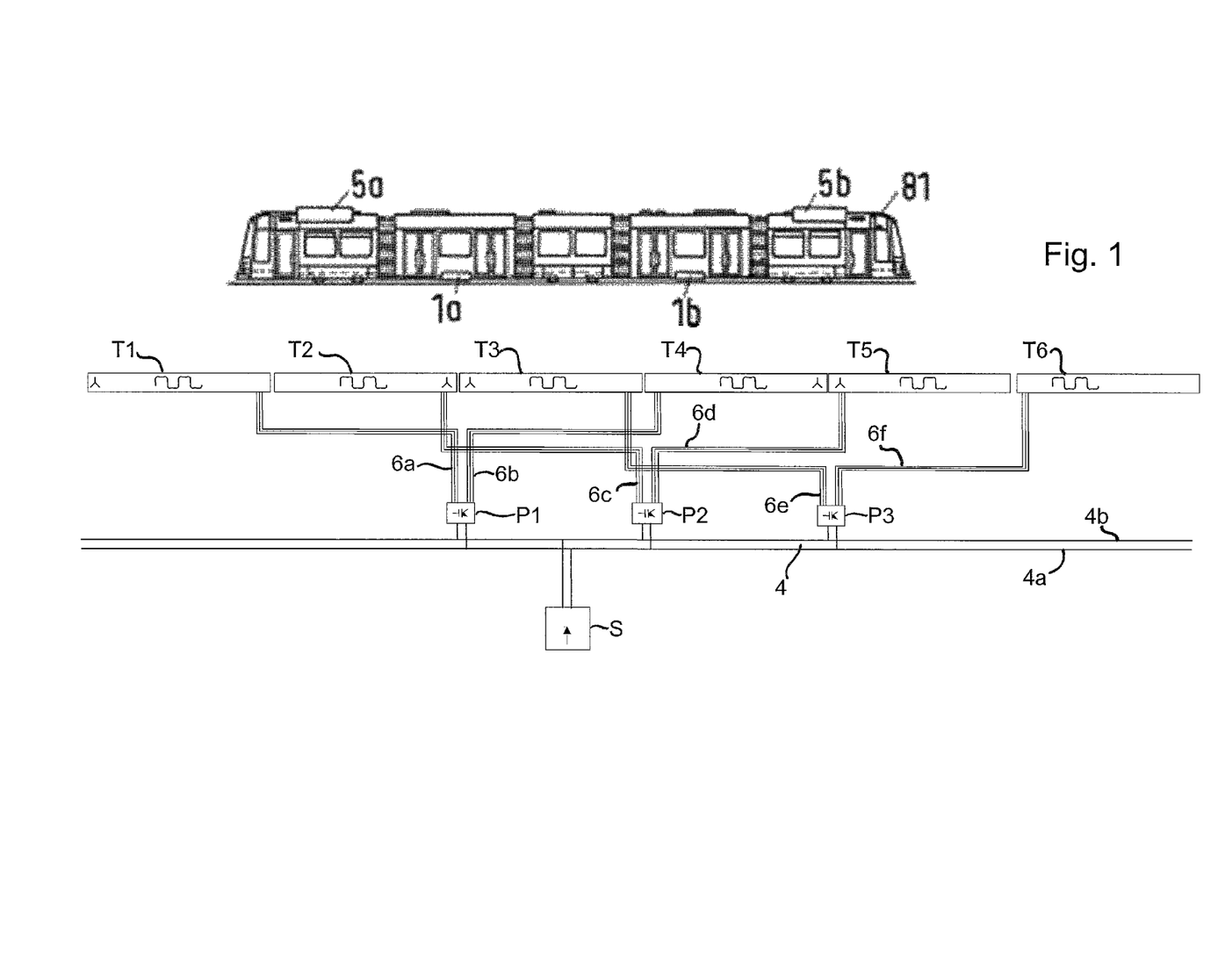
FIG. 1 an arrangement comprising a track for a rail vehicle and the vehicle, wherein the track is equipped with a plurality of segments for producing electromagnetic fields and wherein pairs of segments are connected to the same inverter for inverting a direct current, FIG. 2 a module comprising an inverter, a constant current source and an arrangement of two switching units for connecting the pairs of segments to the constant current source, FIG. 3 a modification of the module of FIG. 2 adapted to provide a pair of segments with constant current, wherein the respective constant current sources of the segments use common first inductances and wherein switches are used to either operate the first segment, the second segment or none of the segments, FIG. 4 a schematic arrangement comprising a track for a rail vehicle and the vehicle, wherein the track is equipped with a plurality of segments for producing electromagnetic fields and wherein pairs of segments are connected to the same inverter, and FIG. 5 a schematic circuit diagram of connections between a source unit and segments of two different tracks.

FIG. 1 schematically shows a vehicle 81, in particular a light rail vehicle such as a tram, travelling along a track. In this specific embodiment, the vehicle 81 comprises two receivers 1a, 1b for receiving electromagnetic fields which are produced by segments T1, . . . , T6 of the track. The receivers 1a, 1b are located at the bottom of the vehicle 81, in a middle section of the front part and back part of the vehicle 81. The receivers may comprise a plurality of lines for producing different phases of an alternating current. A vehicle may have any other number of receivers.

DESCRIPTION OF THE INVENTION

The receivers 1a, 1b are connected with other equipment within the vehicle 81, such as with a converter (not shown) for converting an alternating current produced by the receivers 1 to a direct current. For example, the direct current can be used to charge batteries or other energy storages 5a, 5b of the vehicle 81. Furthermore, the direct current can be inverted into an alternating current used to feed at least one traction motor of the vehicle 81 with electric energy.

The receivers 1a, 1b may be connected with a control device for controlling the operation of signal transmitters (not shown) which are also located at the bottom of the vehicle 81, so that signals emitted by the signal transmitters are emitted towards the track.

As mentioned, the track comprises a series of consecutive segments T1, T2, T3, T4, T5, T6 (in practice, further segments can be provided) which can be operated (i.e. energized) separately of each other and which produce during operation an electromagnetic field in order to transfer energy to the vehicle 81. Each segment extends across a section of the path of travel of the vehicle. It is shown that the consecutive segments T1, T2, T3, T4, T5, T6 are spaced closely to each other.

In the situation shown in FIG. 1, the receivers 1a, 1b of the vehicle 81 are located above segments T2, T4, respectively. Therefore, these segments T2, T4 are operated (i.e. are in the on-state, a current is flowing through the segment which causes the electromagnetic field) and the other segments T1, T3, T5, T6 are not operated (i.e. are in the off-state, there is no current through the segment).

Also shown is a direct current supply 4 having a first line 4a at a first electric potential and a second supply line 4b at another electric potential. An energy source S is connected to the lines 4a, 4b. Each segment comprises a plurality of lines (in particular three lines) for carrying a separate phase of an alternating current.

In the arrangement shown in FIG. 1, a plurality of inverters P1, P2, P3 is connected in parallel to each other with the direct current supply 4 having lines 4a, 4b. The inverters P1, P2, P3 are connected to a plurality of alternating current supplies and each of these supplies connects the inverter P1, P2, P3 with one segment T1, T4 or T2, T5 or T3, T6. According to the specific embodiment shown in FIG. 1, each inverter P1, P2, P3 is connected to two segments T1, T4; T2, T5; T3, T6.

A first set of segments comprises the segments T1, T4. A second set of segments comprises the segments T2, T5. A third set of segments comprises the segments T3, T6. The first inverter P1 is connectable to each segment T1, T4 of the first set of segments. The second inverter P2 is connectable to each segment T2, T5 of the second set of segments. The third inverter P3 is connectable to each segment T3, T6 of the third set of segments.

Each neighboring segment T2, T3, T5 of each segment T1, T4 of the first set of segments T1, T4 is exclusively connectable to another inverter P2, P3 than the first inverter P1. Also, each neighboring segment T1, T3, T4, T6 of each segment T2, T5 of the second set of segments T2, T5 is exclusively connectable to another inverter P1, P3 than the second inverter P2. Also, each neighboring segment T2, T4, T5 of each segment T3, T6 of the third set of segments T3, T6 is exclusively connectable to another inverter P1, P2 than the third inverter P3.

As schematically indicated by the length of the vehicle 81 traveling along the segments T1, . . . , T6, only one segment T1, T2, T3 or T4, T5, T6 of the pairs of segments T1, T4 or T2, T5 or T3, T6 is operated while the vehicle 81 is traveling in the position shown in FIG. 1. Segments T2, T3, T4 are operated in order to transfer energy to the receivers 1a, 1b of vehicle 81. Operation of segments T1, T5, T6 would not result in a significant energy transfer to the vehicle 81. If the vehicle continues traveling from left to right in FIG. 1, segment T2 will be switched off and segment T5 will be switched on instead.

As a result, only one of the segments T1, T2, T3 or T4, T5, T6 of a pair of segments T1, T4 or T2, T5 or T3, T6 which is connected to the same inverter P1, P2, P3 will be operated at a time. Therefore, it is possible to combine the inverter P1, P2, P3 with a constant current source (not shown in FIG. 1) which is adapted to produce a desired constant current through a single segment T1, T2, T3, T4, T5, T6. In alternative arrangements, it would be possible, for example, to connect more than two segments T1, . . . , T6 to the same inverter P1, P2, P3 and to operate only one of these segments T1, . . . , T6 at a time.

The constant current source can e.g. be connected to an output of the respective inverter P1, P2, P3, wherein the segments are connectable to a respective inverter via the constant current source.

Also not shown in FIG. 1 is a switching unit adapted to switch on and off the segment by connecting or disconnecting the segment T1, . . . , T6 to/from the inverters P1, P2, P3. Since each segment T1, T2, T3, T4, T5, T6 of the example shown in FIG. 1 comprises three lines for carrying a different phase of an alternating current, each switching unit comprises three switches, at least on switch per line.

A first switching unit can be assigned to the first inverter P1 and can be adapted to switch on and off the segment T1, T4 by connecting or disconnecting the segment T1, T4 to/from the inverter P1.

Figure 2:
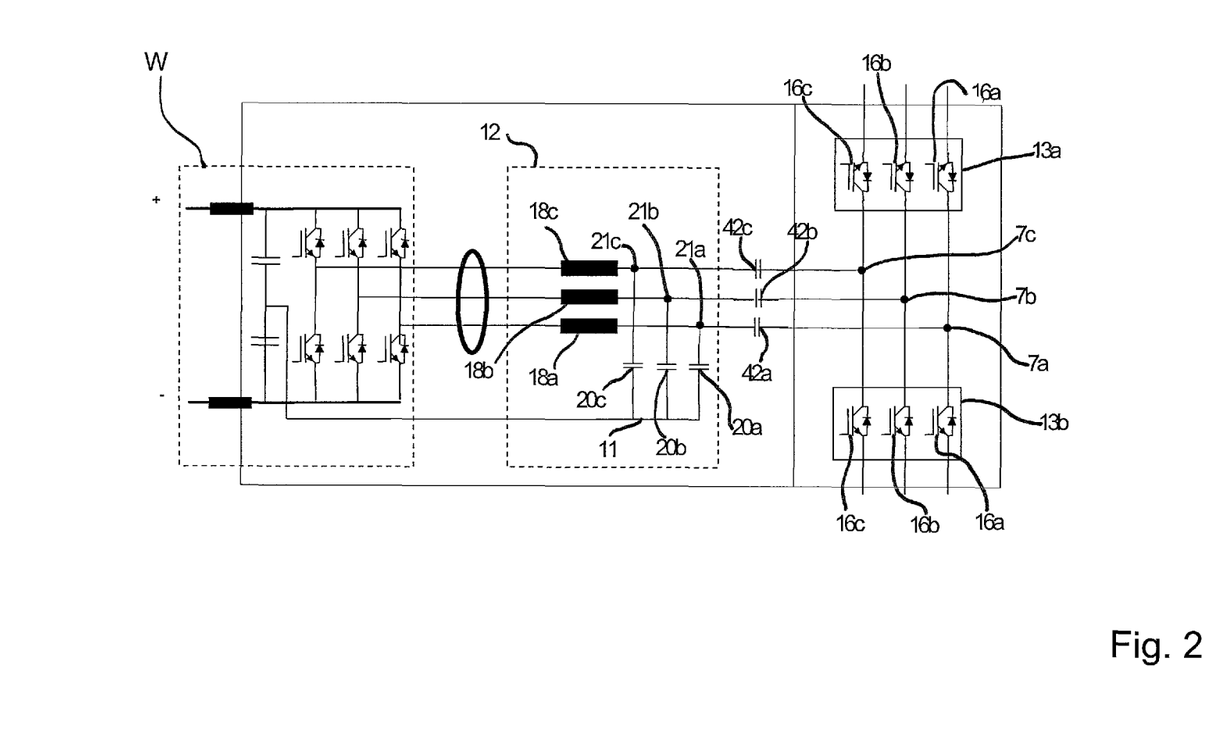

FIG. 2 shows a module comprising an inverter W which may be constructed as known to a skilled person. For example, in case of a three-phase alternating current to be produced, there may be bridges comprising a series connection of two semiconductor switches for each phase. Since the construction of inverters is known, the details are not described with reference to FIG. 2. On the alternating current side, the inverter W is connected to a constant current source 12. This constant current source 12 consists of a network of passive elements, namely one inductance 18a, 18b, 18c in each phase line of the alternating current and one capacitance 20a, 20b, 20c in a connection which connects one of the phase lines starting at a junction 21a, 21b, 21c to a common star point 11.

The constant current source may also comprise a second inductance in each phase line which is located at the opposite side of the junction 21 as the first inductance 18. Such an arrangement can be called a three-phase T-network. The purpose of the second inductance is to minimize the reactive power produced by the segment which is connected to the constant current source.

In the example shown in FIG. 2, the phase lines of the constant current source 12 are connected to junctions 7a, 7b, 7c via a second capacitance 42a, 42b, 42c. The capacitances 42 serve to compensate the inherent inductances of the segments which can be connected to the junctions 7. "Compensation" in this case means the reactive power produced by the respective segment is minimized while the segment is operated. This illustrates the principle that the compensating capacitance can be integrated in the module which also comprises the constant current source.

In the example shown in FIG. 2, a first switching unit 13a comprising semiconductor switches 16a, 16b, 16c, one in each phase line, is connected to the junctions 7a, 7b, 7c and in a similar manner the semiconductor switches 16a, 16b, 16c of a second switching unit 13b are also connected to the junctions 7. For example, the first switching unit 13a may be connected to the alternating current supply 6a, 6c or 6e of FIG. 3 and the second switching unit 13b may be connected to the alternating current supply 6b, 6d or 6f of FIG. 1.

The module shown in FIG. 2 can be used instead of the inverters P1, P2, P3 shown in FIG. 1.

As mentioned above, constant current sources for more than one segment of the same track and/or of another track can be integrated in a common module. In particular, such a module can be pre-fabricated and can be installed on side with little effort. The common module can e.g. be used instead of an inverter P1, P2, P3 shown in FIG. 1.

Figure 3:
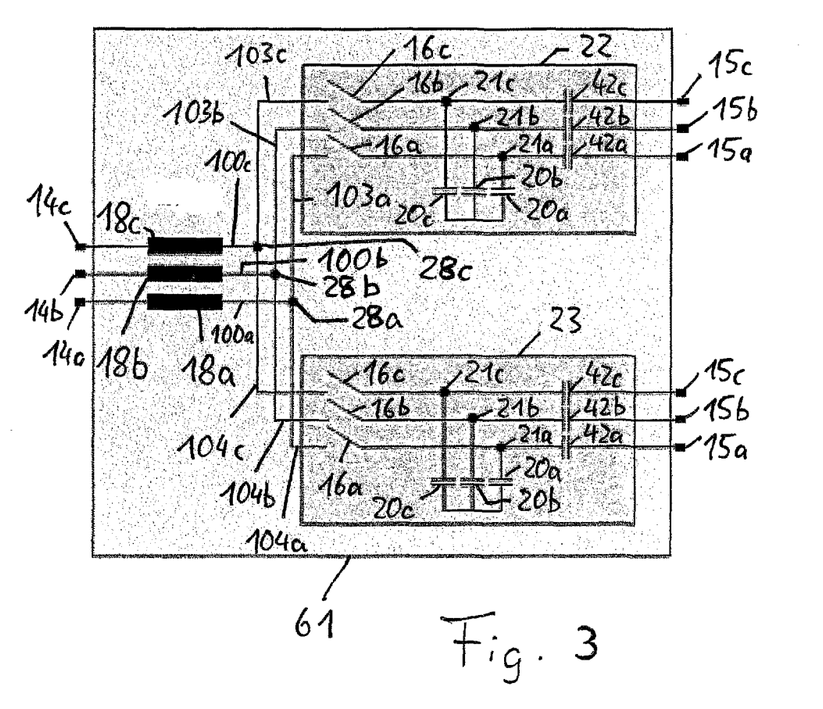

An example of such a common module for two segments is shown in FIG. 3, which shows a modification of the module of FIG. 2. The module 61 comprises two sub-units 22, 23 each of which forms a part of the respective constant current sources of the segments to be connected to the second contacts 15a, 15b, 15c. As mentioned above, same reference numerals in different figures denote identical or functionally corresponding elements.

The sub-units 22, 23 comprise the first capacitances 20 and (optionally) the second capacitances 42a, 42b, 42c of the constant current source. In addition, the sub-units 22, 23 comprise a switch 16a, 16b, 16c in each line 103a, 103b, 103c (unit 22) or 104a, 104b, 104c (unit 23). These switches 16 are used to either operate the first segment (not shown, which is connected to the second contacts 15 of unit 22), to operate the second segment (not shown, which is connected to the second contacts 15 of unit 23) or to operate none of the segments. Therefore, the units can use the same first inductances 18a, 18b, 18c on the input side of the module 61.

The input side comprises first contacts 14a, 14b, 14c for connecting the module to the supply (not shown). These contacts 14 are connected to a junction 28a, 28b, 28c by lines 100a, 100b, 100c and each of these lines 100 comprises a first inductance 18. Each of the junctions 28 connects one of the lines 100 with the respective lines 103a, 104a; 103b, 104b; 103c, 104c of the units 22, 23.

Since the same first inductances 18a, 18b, 18c are used to operate several segments (more than two segments can be operated in the same manner, if there are more than 2 sub-units) the number of components is reduced.

Figure 4:
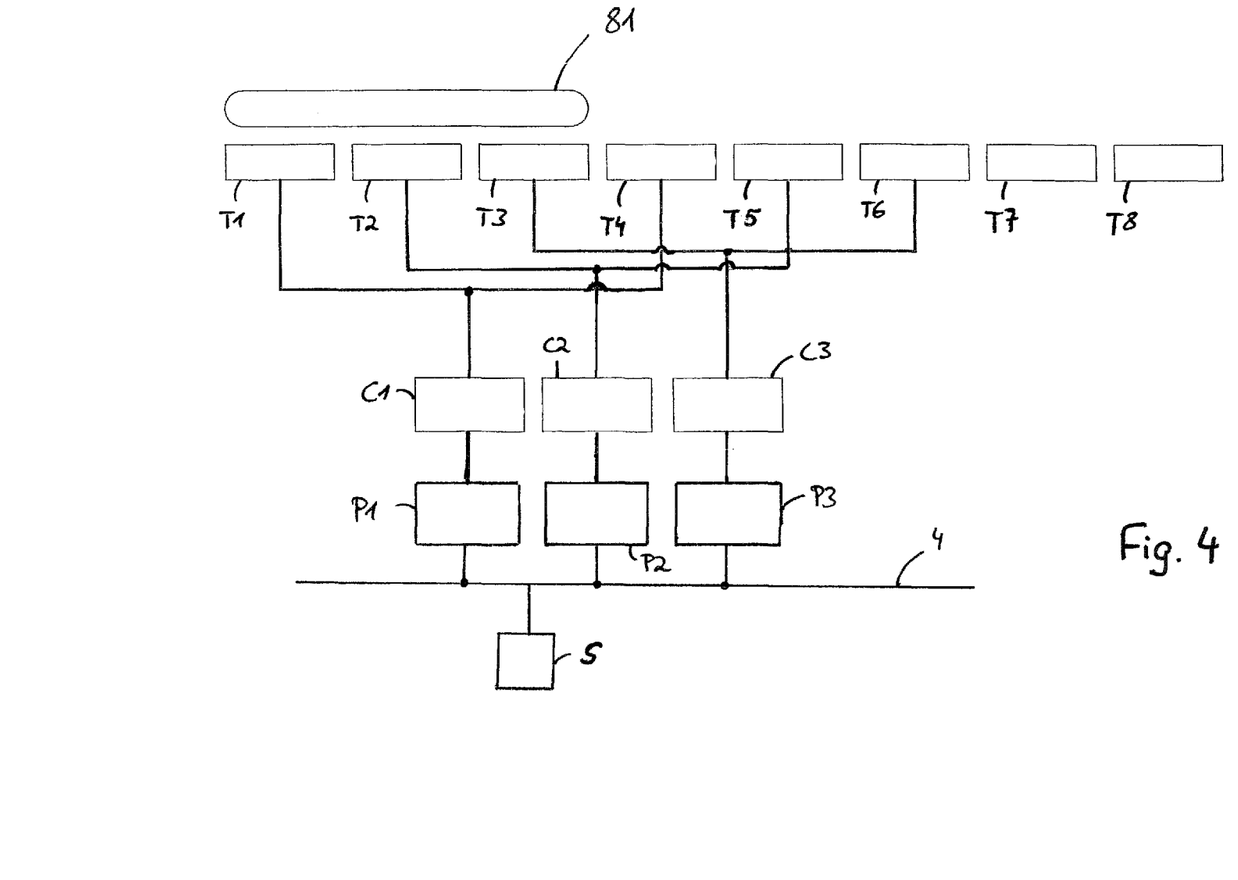

FIG. 4 shows a schematic arrangement comprising a track for a rail vehicle and the vehicle 81, wherein the track is equipped with a plurality of segments T1, . . . , T8 for producing electromagnetic fields and wherein pairs of segments T1, T4 or T2, T5 or T3, T6 are connected to the same inverter P1, P2, P3 respectively. In contrast to FIG. 1 it is shown that segments T1, . . . , T6 of pairs of segments T1, T4 or T2, T5 or T3, T6 are connectable to the inverters P1, P2, P3 via constant current sources C1, C2, C3. E.g., a first inverter P1 is connectable to each segment T1, T4 of a first set of segments via a first constant current source C1. Also, a second inverter P2 is connectable to each segment T2, T5 of a second set of segments via a second constant current source C2. Also, a third inverter P3 is connectable to each segment T3, T6 of a third set of segments via a third constant current source C3. The first inverter P1 and the first constant current source C1 form a first source unit. Not shown are switching modules which are adapted to switch on and off a segment by connecting or disconnecting the segment T1, . . . , T6 to/from the source units.

Any segment T1, . . . , T8 including its connection to a source unit comprises an inherent inductance. In FIG. 4, the constant current sources C1, C2, C3, in particular the elements of the constant current sources, can be adapted such that a segment T1, . . . , T6 can be operated at a corresponding resonance frequency and the reactive power produced by the segment T1, . . . , T6 is essentially zero. E.g., the first constant current source C1 can be adapted such that the segment T1 or T4 can be operated at a corresponding resonance frequency and the reactive power produced by the segment T1 or T4 is essentially zero.

Figure 5:
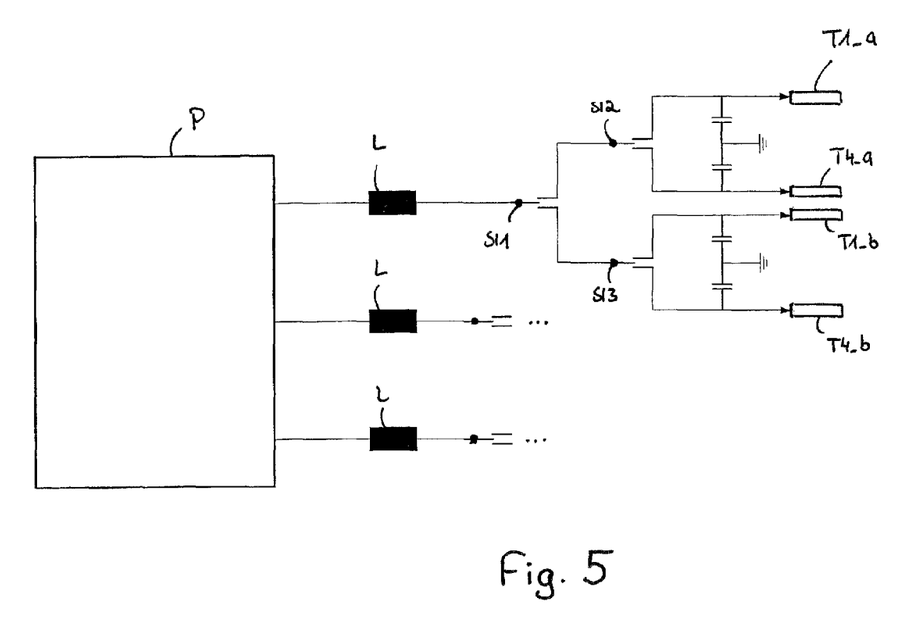

FIG. 5 shows a schematic circuit diagram of connections between a source unit and segments of two different tracks. An inverter P is connectable to first set of segments T1_a, T4_a which are assigned to a first track, e.g. a first rail track. Further, the inverter P is connectable to another set of segments T1_b, T4_b which are assigned to a second track, e.g. a second rail track. The first and the second rail track can e.g. extend in parallel to each other and each of the tracks may be provided with consecutive segments. At least some of the segments T1_a, T4_a, T1_b, T4_b of different tracks may be operated by a common inverter P.

The connection is only shown for a first phase of an alternating current but it is to be understood that the connection in case of the other phases is designed equally.

A first output of the inverter P is connected to via inductance L to a first switch SI1. The first switch SI1 is adapted to connect or disconnect the set of segments T1_a, T4_a assigned to the first track to the inverter P. Also, the first switch SI1 is adapted first switch is adapted to connect or disconnect the set of segments T1_b, T4_b assigned to the second track to the inverter P.

With respect to the first track, an output of the first switch SI1 is connected to a second switch SI2. The second switch SI2 is adapted to connect or disconnect the segment T1_a or the segment T4_a of the set of segments T1_a, T4_a to the inverter P. With respect to the second track, an output of the first switch SI1 is connected to a third switch SI3. The third switch SI3 is adapted to connect or disconnect the segment T1_b or the segment T4_b of the set of segments T1_b, T4_b assigned to the second track to the inverter P.

The switches SI1, SI2, SI3 are inserted on the voltage side of the inverter P. This advantageously limits the number of inductor filters, e.g. the number of inductances L, to one per phase.

The invention claimed is:

1. A system for transferring electric energy to a vehicle, comprising:
    at least one electric conductor arrangement for producing an alternating electromagnetic field and for thereby transferring electromagnetic energy to the vehicle,
    the conductor arrangement comprises a plurality of segments, wherein each segment extends along a section of the path of travel of the vehicle,
    each segment comprises one line for each phase of an alternating current which is to be carried by the segment in order to produce the electromagnetic field,
    a plurality of source units for providing the alternating current to the respective segment,
    the system comprises a current supply for conducting electric energy to the plurality of source units,
    the plurality of source units are connected in parallel to each other with respect to the current supply,
    at least a first source unit of the plurality of source units is connectable to each segment of a first set of at least two segments of the at least one conductor arrangement, and
    each neighboring segment to each segment of the first set of segments is exclusively connectable to another source unit.

2. The system of claim 1, wherein a source unit is connectable to a segment by a switching unit.

3. The system of claim 1, wherein a source unit comprises a voltage converter.

4. The system of claim 1, wherein a source unit comprises a constant current source.

5. The system of claim 1, wherein only one segment of the first set of segments is operated at a time.

6. The system of claim 1, wherein the first set of segments comprises an even-numbered plurality of segments.

7. The system of claim 1, wherein at least one segment which is connectable to a second source unit is placed between two succeeding segments of the first set of segments.

8. The system according to claim 1, wherein the first source unit is designed and/or arranged such that inherent impedances and inherent inductances of the connections of the first source unit to the segments of the first set of segments are equal.

9. The system of claim 8, wherein the first source unit is arranged with respect to at least two segments of the first set of segments such that distances between the first source unit and each of the at least two segments are equal.

10. The system according to claim 1, wherein the first set of segments comprises a first plurality of segments of a first conductor arrangement and a second plurality of segments of a second conductor arrangement.

11. The system of claim 10, wherein the first conductor arrangement is assigned to a first track for vehicles and the second conductor arrangement is assigned to a second track for vehicles.

12. The system for transferring electric energy to a vehicle as in claim 1, wherein the vehicle or a road automobile.

13. A method of operating a system for transferring electric energy to a vehicle, in particular the system of one of the preceding claims, including the steps:
    producing an alternating electromagnetic field and thereby transferring electromagnetic energy to the vehicle by using an electric conductor arrangement,
    using a plurality of segments as parts of the conductor arrangement, wherein each segment extends along a different section of the path of travel of the vehicle, wherein one line or a plurality of lines of each segment is/are used to carry a respective phase or respective phases of an alternating current which produces the electromagnetic field,
    using a plurality of source units to provide electric energy to the plurality of segments, wherein at least a first source unit of the plurality of source units is connectable to a first set of at least two segments,
    conducting electric energy to the plurality of source units by using a current supply, wherein the source units are electrically connected in parallel to each other with respect to the current supply,
    conducting electric energy to at least one segment of the first set of segments by connecting the first source unit to the at least one segment, and
    electric energy is conducted to a neighboring segment to the at least one segment of the first set of segments by connecting the neighboring segment to another source unit.

14. The method of claim 13, wherein during the conduction of electric energy, a source unit is connected exclusively to one segment of the set of segments which is connectable the source unit.

15. The method of claim 13, wherein the electric energy is conducted to the neighboring segment in between two of the segments of the first set of segments by connecting the neighboring segment to the other source unit, wherein the neighboring segment, the two segments of the first set of segments and optionally at least one further segment of the conductor arrangement form a sequence of consecutive segments along the track.

16. A method of manufacturing a system for transferring electric energy to a vehicle, in particular the system of claim 1, including the steps:
    providing an electric conductor arrangement for producing an alternating electromagnetic field and for thereby transferring electromagnetic energy to the vehicle,
    providing a plurality of segments as part of the conductor arrangement, so that each segment extends along a section of the path of travel of the vehicle, wherein each segment comprises one line for each phase of an alternating current which is to be carried by the segment in order to produce the electromagnetic field,
    providing a plurality of source units, providing a current supply for conducting electric energy to the plurality of the source units, wherein the source units are electrically connected in parallel to each other with respect to the current supply, for each segment providing a switchable electric connection of the segment and a source unit such that for each segment of at least a first set of at least two segments an electrical connection between the segment and a first source unit is provided, and for each neighboring segment to each segment of the first set of segments providing an electrical connection between the neighboring segment and another source unit.

17. The method of claim 16, wherein the electric connections between the first source unit and the segments of the first set of segments are provided such that the first source unit is connectable exclusively to one segment of the first set of segments.

\* \* \* \* \*

UNITED STATES PATENT AND TRADEMARK OFFICE
CERTIFICATE OF CORRECTION

| | |
|---|---|
| PATENT NO. | : 9,331,527 B2 |
| APPLICATION NO. | : 14/124301 |
| DATED | : May 3, 2016 |
| INVENTOR(S) | : Konrad Woronowicz |

It is certified that error appears in the above-identified patent and that said Letters Patent is hereby corrected as shown below:

In the claims,

Column 16, Line 14, Claim 12, after "vehicle" insert -- is a track bound vehicle --

Signed and Sealed this
Second Day of August, 2016

Michelle K. Lee
*Director of the United States Patent and Trademark Office*